United States Patent [19]

Woodin et al.

[11] Patent Number: 4,848,655
[45] Date of Patent: Jul. 18, 1989

[54] DUAL HEATING SYSTEM

[76] Inventors: George B. Woodin, 6200 Fair Valley Dr., Charlotte, N.C. 28226; David B. Chilton, 4344 University Dr., Charlotte, N.C. 28209

[21] Appl. No.: 148,899

[22] Filed: Feb. 10, 1988
(Under 37 CFR 1.47)

Related U.S. Application Data

[63] Continuation-in-part of Ser. No. 15,284, Feb. 17, 1987, abandoned.

[51] Int. Cl.⁴ .............................................. F24D 3/00
[52] U.S. Cl. ..................................... 237/8 R; 237/19; 236/25 R
[58] Field of Search ........................... 237/19, 8 R, 16; 236/25 R

[56] References Cited

U.S. PATENT DOCUMENTS 3,254,839  6/1966  McClanahan et al. ................ 237/19
4,700,886  10/1987  McGhee et al. .................. 236/25 R Primary Examiner—Henry A. Bennet
Attorney, Agent, or Firm—Bell, Seltzer, Park & Gibson

[57] ABSTRACT

A heating system providing an instantaneous source of hot water to either a water sink or to a source of heat or to both. The system includes means for receiving cold water and converting it to hot water where the cold water is converted to hot water essentially instantaneously, obviating the need for a water storage tank. The heat in the water is converted to a source of space heat utilizing a water to air heat exchanger. The system also includes means for directing the flow of hot water to the water to air heat exchanger in response to a demand for heat signal, and means for directing the flow of hot water to hot water sinks. A flow rate detector monitors the flow to the sink and provides a signal indicative thereof. In response to this signal, means for controlling the flow of hot water to the water to air heat exchanger allows hot water to flow only to the hot water sinks when the flow rate exceeds a predetermined threshold rate as determined by the flow rate detector by interrupting the demand for heat signal.

13 Claims, 1 Drawing Sheet

DUAL HEATING SYSTEM

This is a continuation-in-part of application Ser. No. 015,284, filed Feb. 17, 1987 which is now abandoned, incorporated herein by reference.

FIELD OF THE INVENTION

This invention relates to a system which provides an instantaneous source of hot water for a water sink and a heat exchanger, and provides a higher priority for water demand at the water sink.

BACKGROUND OF THE INVENTION

In the past, most buildings, especially houses, were built with separate heating sources for domestic hot water and household heat. This included separate energy conversion units and segregated distribution systems, namely separate gas or oil burners or electric elements; separate sets of controls, namely separate thermostats, thermocouples, electric valves and regulators; separate hot water storage tanks, and separate conduits for transferring the heated water. It is readily apparent that there is a great deal of duplication of common components leading to inefficient generation of heat energy, duplicate loss of heat through storage tanks, and wasted space.

One solution is to utilize a tankless, on-demand water heater to provide hot water, thereby eliminating some of the wasted space and duplication of hot water storage tanks. These systems tend to be more energy efficient because tank stand-by heat loss is eliminated. These tankless systems, however, typically determine the water heating requirements by summing the maximum demands for hot water for domestic use and for household heat. Thus, in order to adequately meet the high priority demands for maximum domestic use while there is also a maximum demand for hot water for household heat, an excessive capacity for heating the water is usually required, but seldom used. Moreover, these systems use dual heat exchangers with separate conduit loops to separately heat different water for sinks and for space heating purposes. This all results in an excessively high capacity heating unit, inefficiently uses the heat source, requires an unduly large system and is unduly expensive.

The system of the present invention provides the benefits of a tankless water heater, yet permits use of a smaller capacity heater by incorporating it into a system using a flow detector. This system uses a single source of water having a single heat exchanger to heat all water and to use only that heated water for both domestic household use, such as the hot water faucets and showers (a high priority), and for heat for the house (a lower priority). The single instantaneous heat source using a single heat exchanger eliminates the waste of energy occurring when separate heat sources and separate distribution systems are employed or heat is lost through one or more water storage tanks, and eliminates the waste of space required by multiple storage water tanks and conduit loops. However, in order to effectively provide hot water for domestic use when there is a simultaneous demand for heat, assuming domestic use is of a higher priority, the flow of hot water must be detected and regulated. This is done by reducing the hot water supply to the water to air heat exchanger of the heating system when the demand for hot water for domestic use exceeds a predetermined threshold. Such an interruption in the hot water supply for heating the house is usually of little consequence because the loss of heat by a house is very slow, and a short interruption is barely, if at all, perceptible. The present invention uses a fluid flow rate detector which controls an electric switch. The switch may be placed in series with a pump that regulates the water flow to the heat exchanger.

With respect to systems providing a source of hot water and a source of household heat from a single source, an exemplary system is shown in U.S. Pat. No. 4,178,907 to Sweat, Jr. However, the system does not utilize a flow rate detection device to detect, regulate, or prioritize the flow of fluid to the hot water faucets or sinks and to the house heating system. Moreover, the system does not utilize an instantaneous source of heat for the water.

In the past, it also has been known to utilize various flow actuated control devices to adjust the flow of fluid. Exemplary devices are illustrated in U.S. Pat. No. 2,963,563 to Patterson, U.S. Pat. No. 4,313,111 to Anderson, U.S. Pat. No. 4,497,434 to Lawless, and U.S. Pat. No. 4,513,184 to Hughes. However, there is no disclosure of the use of any of these control devices to prioritize the flow of hot water from an instantaneous heat source between hot water sinks and a water to air heat exchanger for space heating.

It is, therefore, an object of the present invention to provide a heating system having an instantaneous source of hot water for both a water sink and for a water to air heat exchanger, and a fluid flow detector to govern fluid flow to the water sink and heat exchanger. These and other objects and advantages of the invention will be particularly identified below.

SUMMARY OF THE INVENTION

A dual heating system which provides an instantaneous source of hot water, without the need for a water storage tank, to both a hot water sink and to a water to air heat exchanger is a particularly needed system in modern energy and space conserving homes. In accordance with the present invention, heating system is provided where, when a high quantity of hot water is demanded at a sink, the flow of hot water to the water to air heat exchanger is controlled in order to provide sufficient hot water at that sink. The heating system includes means for receiving cold water and converting it to hot water where said means utilizes a single heat exchanger with a single waterway to convert the cold water to hot water and does so instantaneously, obviating the need for a water storage tank. A water to air heat exchanger is employed to convert the heat in the water to a source of space heat. The flow of the hot water from the same source to the water to air heat exchanger and the hot water sink is controlled by a flow rate detector. In response to a signal therefrom, the demand for heat signal is interrupted when the flow rate to the sink exceeds a predetermined threshold rate as determined by the detector so that the flow of hot water is controlled to flow to only the hot water sink during high demand.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, applicants provide these embodiments so that this disclosure will be thorough and complete, and will fully convey the scope of the invention to those skilled in the art.

Figure 1:
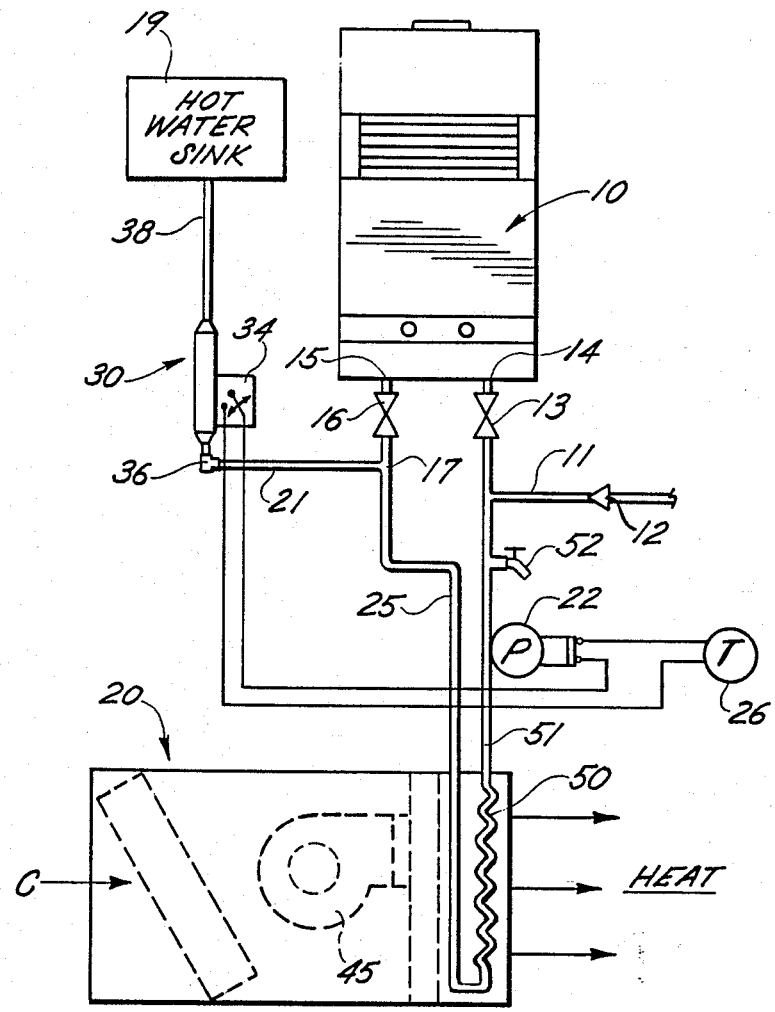
FIG. 1 is a schematic representation of a heating system providing instantaneous hot water to a hot water sink and to a heat exchanger.

Referring to FIG. 1, a dual heating system which utilizes in combination an instantaneous hot water source 10, hot water sinks 19, a flow rate detector 30 and a heat exchanger 20 is shown. These assemblies are coupled together by pipes, conduits and pumps, as will be more fully discussed below.

Cold water is supplied under pressure from a municipal system or well to the instantaneous single heat source 10 through a cold water supply conduit 11. A check valve 12 prevents the backflow of water into the supply of cold water, and the valve may include means for reducing any pressure in the system caused by expansion due to the heated water. The cold water flows through an open inflow valve 13 and an inflow port 14 leading into the heat source 10. An exemplary means for converting the cold water to hot water virtually instantaneously is a tankless preferably gas water heater which can provide about 75,000 to 200,000 BTUs. This instantaneous tankless gas water heater utilizes a single heat exchanger within the heater and single waterway to convert the cold water to hot water. Thus the water is not segregated during conversion as done in the past, and the use of multiple heat exchangers in the hot water heat source is avoided. The instantaneous water heater is typically wall mounted and obviates the need for a water storage tank and a large amount of space is conserved. Hot water exits the source 10 through a single output port 15 and an open output valve 16 to a T-channel 17 so the water can flow to either the hot water sinks 19 representing a domestic use of the hot water (cooking, cleaning, showers, etc.), or to a water to air heat exchanger 20 for heating the house, or to both.

Figure 2:
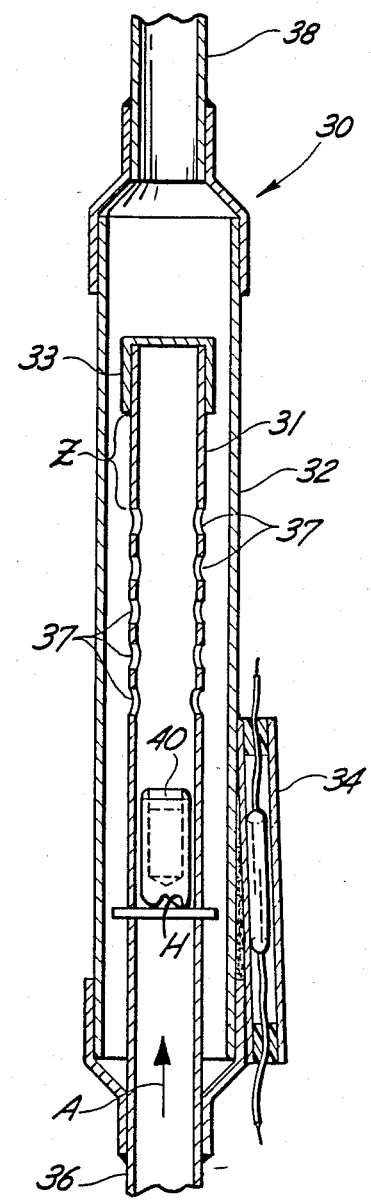
FIG. 2 is a vertical sectional view of an exemplary fluid flow detector.

Hot water directed to the hot water sinks flows thereto via a water supply conduit 21 and through a flow rate detector 30 which monitors the flow rate for all domestic uses of the hot water, or at least for those domestic uses that are deemed to be of higher priority. The flow rate detector is of the type disclosed in copending U.S. application Ser. No. 015,284, herein incorporated by reference (an embodiment of which is illustrated in FIG. 2) and is used to monitor the flow rate from the heat source to the hot water sink. The flow rate detector 30 is comprised of an inner portion 31 and an outer portion 32, a magnetic slug 40 disposed within the inner portion 31, cap means 33 sealing the inner portion, and a magnetically activated switch 34 located on the exterior surface of the outer portion 32.

Hot water directed to the heat exchanger 20 flows from the T-channel 17 through conduit 25, and is circulated through a water coil 50 utilizing a pump 22. Many different types and combinations of water to air heat exchangers 20 can be utilized with the one illustrated in FIG. 1 being exemplary. This heat exchanger 20 uses a fan or air handler 45, activated by a thermostat 26 in response to a drop in the temperature in the house, to blow cold air in direction C over or through a hot water coil or radiator 50 having the heated water therein. Other heat exchangers used alone or in combination include radiant floor heaters wherein the hot water is supplied to a hot water coil embedded in the floor, thereby heating the floor and the room, baseboard convectors, and fan convectors. The controlling thermostat 26 of the heat exchanger 20 is typically located remotely from the rest of the system such as in a hallway or in individual rooms of the house. The cooler water moves from the water coil 50 to an exit conduit 51 which returns the cooled water to the inlet port 14 of the heat source 10 to be reheated and recirculated, which allows the system to retain residual heat energy. The exit conduit 51 also includes a flush valve 52 for cleaning out the system and purging the system of air.

The flow rate detector operates as follows. The fluid flow is channeled from the fluid source (i.e. conduit 21) to an inlet 36 of the inner portion 31. The magnetic slug 40 is normally at its home position H as illustrated in FIG. 2, and the magnetic switch 34 is normally closed due to the proximity of the magnetic slug to the switch. As hot water faucets are opened and fluid flow begins, the fluid is directed against the bottom of magnetic slug 40 in the inner portion 31. When the flow reaches a predetermined threshold rate, the slug 40 is moved a distance proportional to the rate of flow away from the home position H in the direction of fluid flow A. This movement of the slug 40 increases the distance to the switch 34 and changes the state of the magnetically activated switch 34, which can then be used to control the flow of fluid elsewhere. The fluid flows through the inner portion, exits through perforations 37 into the outer portion 32, and flows into a tube 38 that leads to the household faucets and sink. As the fluid flow rate increases, the magnetic slug is propelled into the zone Z, where it does not impede fluid flow. The detector 30 is typically in a vertical position and the magnetic slug 40 returns by the force of gravity to the home position H when the flow of fluid is less than the predetermined rate. Thus, while the valve is sensitive to low fluid flow rates, such as one half gallon per minute, it does not impede high fluid flow rates. Moreover, it has only one moving part making it reliable, and there are no openings for sensors or levers, making it essentially leakproof.

The heating system operates as follows, assuming there is no demand for domestic use of hot water. Cold water is supplied to the single heat source and the hot water produced is pumped through a T-channel 17 and through conduit 25 to the heat exchanger 20. The hot water is passed through a radiator or hot water coil 50 and air in response to a signal from the thermostat 26 is circulated over the coil. The heated air is then released by circulating it throughout the house using forced air ducts. The cooled water is pumped back to a point downstream of the cold water supply to be reheated and recirculated.

When there is a simultaneous demand for hot water and when the flow of hot water to the hot water sink exceeds a predetermined threshold rate, the detector 30, utilizing the magnetic switch 34 or the like, sends a signal which interrupts the demand for heat signal or otherwise disables the thermostat 26 and the circulation pump 22, thereby allowing hot water to flow to only the hot water sink. When the flow of hot water to the hot water sink falls below the threshold rate, the hot water is again circulated to the water to air heat exchanger for use as a source of household heat. Alternatively, the signal can be used to change the rate of the pump 22 to reduce the flow of hot water to the water to air heat exchanger to the point that full water pressure and quantities are available for domestic use. It is recognized that other or multiple detectors can be utilized to sense and control the flow of hot water to the heat exchanger. Moreover, the detector can employ multiple sensors so that different hot water circuits can be controlled based upon the sensed flow of hot water to the sink.

That which is claimed is:

1. A heating system providing a source of hot water to either a water sink or to a heat exchanger or to both, said system comprising:
    (a) means for receiving cold water and converting it to hot water where said means utilizes a single heat exchanger with a single waterway to convert the cold water to hot water without segregating the water during conversion and does so essentially instantaneously, obviating the need for a water storage tank;
    (b) a water to air heat exchanger for converting the heat in the water to a source of space heat;
    (c) means for directing a flow of hot water to the water to air heat exchanger in response to a demand for heat signal;
    (d) means for directing a flow of hot water to a hot water sink;
    (e) a flow rate detector for monitoring the flow rate to the hot water sink and providing a signal indicative thereof;
    (f) means for controlling the flow of hot water to the water to air heat exchanger in response to the signal from the flow rate detector where the demand for heat signal is interrupted when the flow rate to the hot water sink exceeds a predetermined threshold rate as determined by the flow rate detector so that the means for controlling allows hot water to flow to only the hot water sink.

2. A heating system according to claim 1 wherein said water to air heat exchanger includes a radiator through which hot water passes and an air handler for circulating air over or through the radiator to release the heat in the water to the surrounding media.

3. A heating system according to claim 1 wherein said means for directing the flow of hot water to a heat exchanger includes a pump, responsive to the demand for heat signal, which moves hot water under pressure from the means for receiving cold water and converting it to hot water to the heat exchanger.

4. A heating system according to claim 1 wherein said flow rate detector includes a magnetic slug disposed therein which moves to different positions in response to the flow rate.

5. A heating system according to claim 4 wherein said flow rate detector additionally includes a magnetic switch for providing an electric signal indicative of the flow rate.

6. A heating system according to claim 5 wherein the magnetic switch provides a signal indicative of when the flow rate exceeds the predetermined threshold rate.

7. A heating system according to claim 1 wherein said flow rate detector comprises an inner portion defining an inlet for receiving the hot water flow from a source and perforations downstream from the inlet for allowing the received hot water to flow out of the inner portion, an outer portion defining an inlet for receiving the hot water flowing out of the perforations and an outlet downstream of the outer portion inlet for connection to a hot water sink, the outer portion inlet forming a fluid tight seal with the inner portion, a magnetic slug means disposed within the hot water flow in the inner portion for moving in the direction of hot water flow from a home position when the hot water flow exceeds a predetermined threshold rate and for returning to a home position when the hot water flow is less than a predetermined threshold rate, cap means for sealing the end of the inner portion downstream of the perforations and defining a zone between the perforations and the end cap where when the predetermined rate is sufficient, the magnetic slug if deposited in the zone and hot water flow from the inner portion to the outer portion is permitted to occur at a substantially unimpeded full flow capacity, and a magnetically activated electric switch in series with the means for directing a flow of hot water to the heat exchanger and responding to the movement of the slug, so that the electric switch is open and closed in response to the hot water flow rate through the flow rate detector and thereby interrupts the demand for heat signal so that hot water flows to only the water sink when the hot water flow demand exceeds the predetermined rate.

8. A heating system according to claim 7 wherein said inner portion and outer portion are situated in a vertical position and the magnetic slug returns by the force of gravity to the home position away from the end cap, when the water flow is less than the predetermined rate.

9. A method for providing an instantaneous source of hot water to either a water sink or to a heat exchanger or to both, the method comprising the steps of
    (a) converting cold water to hot water utilizing a single heat exchanger and single waterway and essentially instantaneously, obviating the need for a water storage tank;
    (b) channeling the hot water flow to a water to air heat exchanger for converting the heat in the water to a source of space heat and through a flow rate detector to a hot water sink for domestic use;
    (c) monitoring the flow rate of hot water to the hot water sink;
    (d) generating a signal indicative of the flow rate of the hot water to the hot water sink; and
    (e) interrupting the flow of hot water to the water to air heat exchanger in response to a signal from the flow rate detector when the flow rate to the hot water sink exceeds a predetermined threshold rate as determined by the flow rate detector so that hot water flows to only the hot water sink.

10. A method according to claim 9 wherein said step of channeling the hot water flow to a water to air heat exchanger for converting the heat in the water to a source of space heat includes passing the water through a radiator and circulating air over the radiator to release the heat in the water to the surrounding media.

11. A method according to claim 9 wherein said step of channeling the hot water flow to a water to air heat exchanger comprises pumping the hot water thereto under pressure.

12. A method according to claim 11 wherein said step of interrupting the flow of hot water comprises responding to the generated signal indicative of the flow rate by interrupting the pumping of the hot water.

13. A method according to claim 9 wherein said step of monitoring the flow rate of hot water comprises monitoring to determine when the flow rate exceeds the predetermined threshold rate and said step of generating a signal comprises generating a signal indicative of when the flow rate exceeds the predetermined threshold rate.

* * * * *